United States Patent [19]
Schilling et al.

[11] Patent Number: 6,031,180
[45] Date of Patent: Feb. 29, 2000

[54] BELOW GROUND PRESSURIZABLE CABLE INTERCONNECT ENCLOSURE

[75] Inventors: Robert J Schilling, Fairport; Robert W Mulford, Spencerport; Julio Vazquez, Rochester, all of N.Y.

[73] Assignee: Arco Communications, Inc., Rochester, N.Y.

[21] Appl. No.: 08/897,074

[22] Filed: Jul. 18, 1997

[51] Int. Cl.[7] .................................................. H04G 1/00
[52] U.S. Cl. ........................................ 174/37; 174/37.38
[58] Field of Search .............................. 174/37, 38, 39, 174/40, 17 R, 17 GF; 220/260

[56] References Cited

U.S. PATENT DOCUMENTS

| | | | |
|---|---|---|---|
| 3,660,613 | 5/1972 | Mullin et al. ........................... | 379/326 |
| 3,928,713 | 12/1975 | Davis ......................................... | 174/38 |
| 3,991,288 | 11/1976 | George et al. ........................... | 379/338 |
| 5,189,723 | 2/1993 | Johnson et al. .......................... | 385/134 |
| 5,574,254 | 11/1996 | Mori et al. ............................... | 174/52.3 |
| 5,722,204 | 3/1998 | Stieb et al. ................................. | 52/20 |

*Primary Examiner*—Nestor Ramirez
*Assistant Examiner*—Joseph Waks
*Attorney, Agent, or Firm*—Cumpston & Shaw

[57] ABSTRACT

A below ground enclosure for retaining cable and cable components, wherein the below ground enclosure is pressurizable and the components may be mounted on a vertically actuated rack to be movable between a retracted position inside the enclosure and an extended position above ground. A cooperating lock and valving system is employed to permit pressurization of the enclosure from an internal pressurized gas source upon sealing and locking of the enclosure, and for venting the enclosure upon initiation of the unlocking procedure.

9 Claims, 16 Drawing Sheets

OPEN

CLOSED

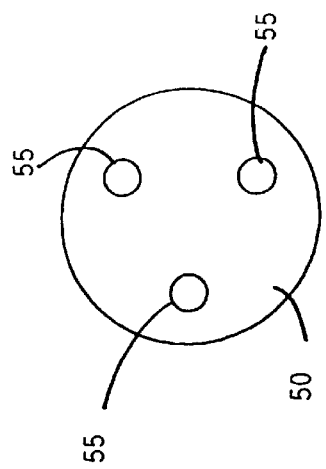
FIGURE 14
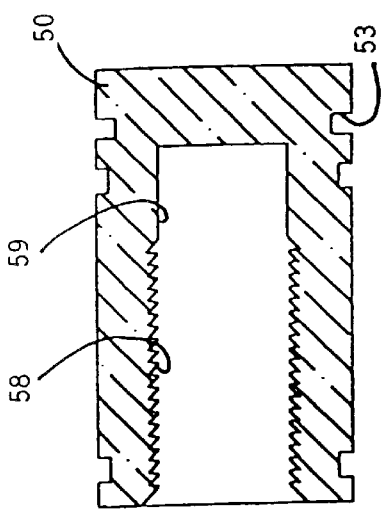
FIGURE 13
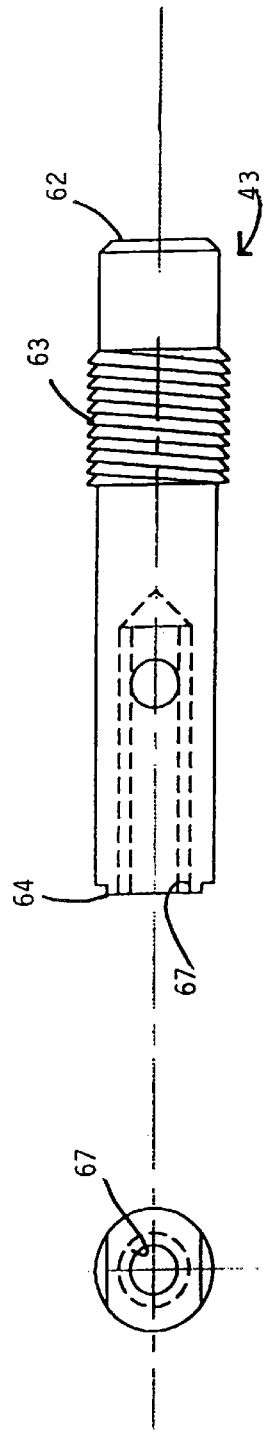
FIGURE 15
FIGURE 16

BELOW GROUND PRESSURIZABLE CABLE INTERCONNECT ENCLOSURE

FIELD OF THE INVENTION

The present invention relates to a below ground interconnect system, and more particularly, to a below ground cable management enclosure for storing and maintaining cables and equipment in a pressurized atmosphere, wherein a portion of the cables are retained on a rack, which in turn can be pneumatically lifted from below ground.

BACKGROUND OF THE INVENTION

A number of devices have been employed to secure fibers underground for selective access. As the number of cable systems being disposed under ground is increasing, there is an increasing need for subterranean enclosures that can accommodate a variety of cable systems under a variety of soil and environmental conditions. Further, as these devices are increasingly employed, the number of devices that are retained within the enclosure increases. These components have a substantial weight which inhibits operator manipulation of the components. In addition, the cables themselves have a weight and rigidity that inhibit effective manipulation and access to the cables.

However, the variety of systems being disposed under ground increases the variety of components and cables that must be accommodated. That is, some systems such as traffic control devices generate a significant quantity of heat that must be dissipated from the components. Fiber optic systems employ components that must be securely protected from the environment. However, there is no single system that can accommodate the variety of cable systems that may be employed under ground.

Therefore, a need exists for a below ground environment that is sealable from the surrounding ambient atmosphere and terrain. The need further exists for such an enclosure to offer enhanced resistance to environmental penetration. A need also exists for such a system to provide communication of the enclosure environment to a central system so that maintenance rather than repairs can be made to the enclosure. It is anticipated that maintenance rather than repairs will reduce the down time of any cable system passing through the enclosure. The need also exists for an enclosure that can readily present the components from the below ground position to provide access to the components as well as the interior of the enclosure.

SUMMARY OF THE INVENTION

The present invention provides a below ground enclosure that can be repeatedly pressurized to provide enhanced resistance to penetration of ambient water, moisture and other elements. The re-pressurization of the enclosure may be repeated multiple times without requiring a recharging of the in situ pressurized gas source.

Generally, the present invention includes a below ground cable component enclosure having a housing defining an interior, a removable cover releasably and repeatedly engaging the housing, a seal assembly intermediate the cover and the housing to provide a repeatable sealed relation therebetween, a pressurized gas source retained in the interior, and a valving assembly for selectively releasing pressurized gas from the gas source to the interior upon sealing the cover relative to the housing and venting pressurized gas from the interior.

Specifically, the present design includes a below ground cable management system having a base having a closed loop seating surface, a sleeve having an upper opening and a lower opening, the upper opening being smaller than the lower opening, a lower sealing surface on the sleeve, the lower sealing surface sized to align with the closed loop seating surface upon cooperative engagement of the case and the sleeve, a peripheral collar at the upper opening of the sleeve, a closed loop inner cover seating surface spaced from the collar, a closed loop outer cover seating surface spaced from the collar by a greater distance than the inner cover seating surface, a cover having a planer top and a depending skirt, a closed loop inner sealing surface on the skirt, sized to cooperatively align with the inner cover seating surface, a closed loop outer sealing surface on the skirt sized to cooperatively align with the outer cover seating surface, a plurality of locks connected to the cover for releasably retaining the cover to the sleeve with sufficient force to sustain a positive pressure in the system, a rack sized to be received through the upper opening, and an actuator connected to the rack and the base for selectively disposing the rack between a retracted position within the sleeve and an extended position disposing a portion above the upper opening.

BRIEF DESCRIPTION OF THE DRAWINGS

FIG. 13 is a driver in the lock assembly.

FIG. 14 is an end view of the driver of FIG. 13.

FIG. 15 is a driven shaft in the lock assembly.

FIG. 16 is an end view of the driven shaft of FIG. 15.

DETAILED DESCRIPTION OF THE PREFERRED EMBODIMENTS

Figure 1:
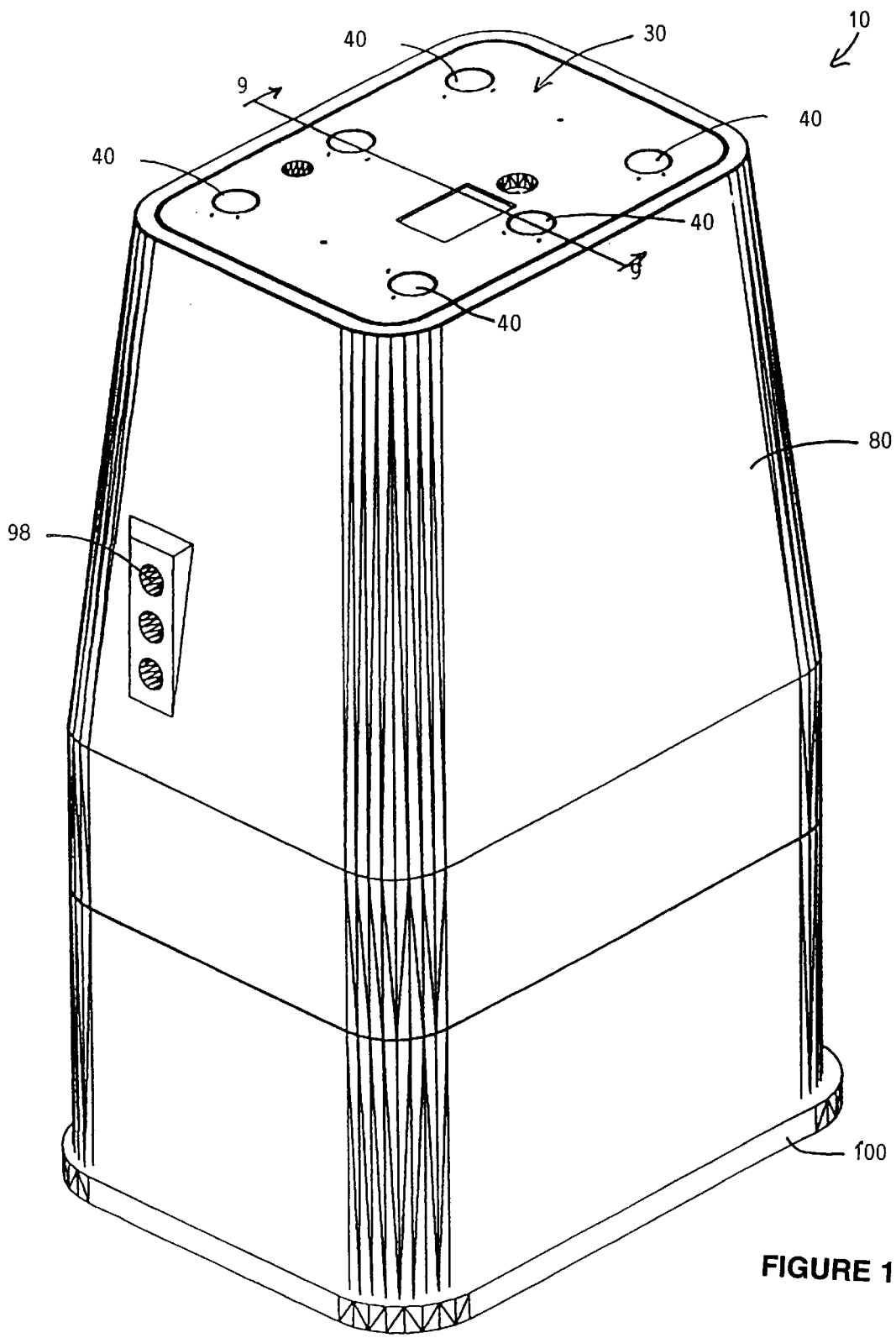
FIG. 1 is a perspective view of the enclosure in a closed configuration.
Figure 17:
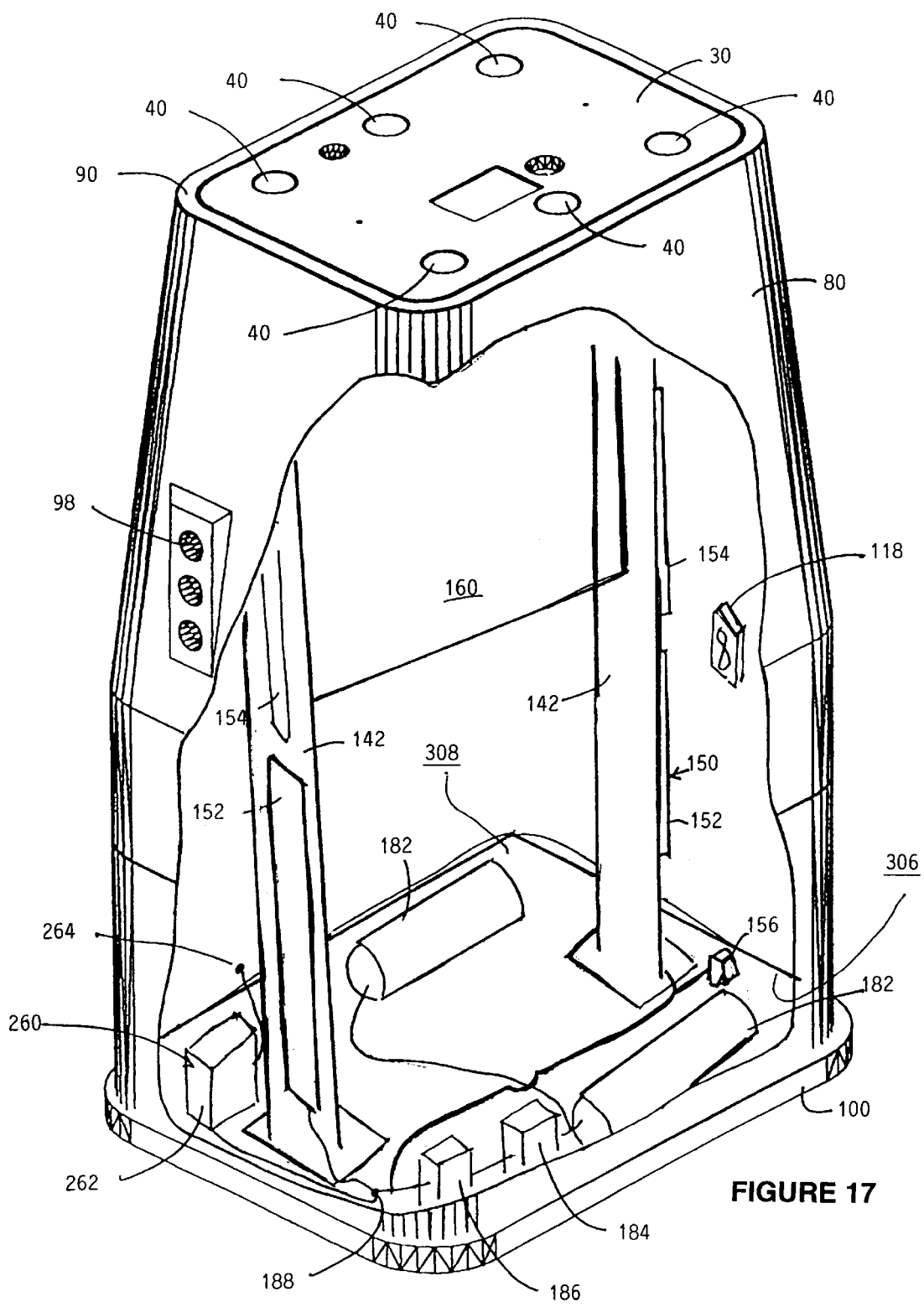
FIG. 17 is a perspective view of the enclosure in a closed configuration with a partial cut away showing a schematic representation of the pressurized gas supply and pressure regulation system.
Figure 18:
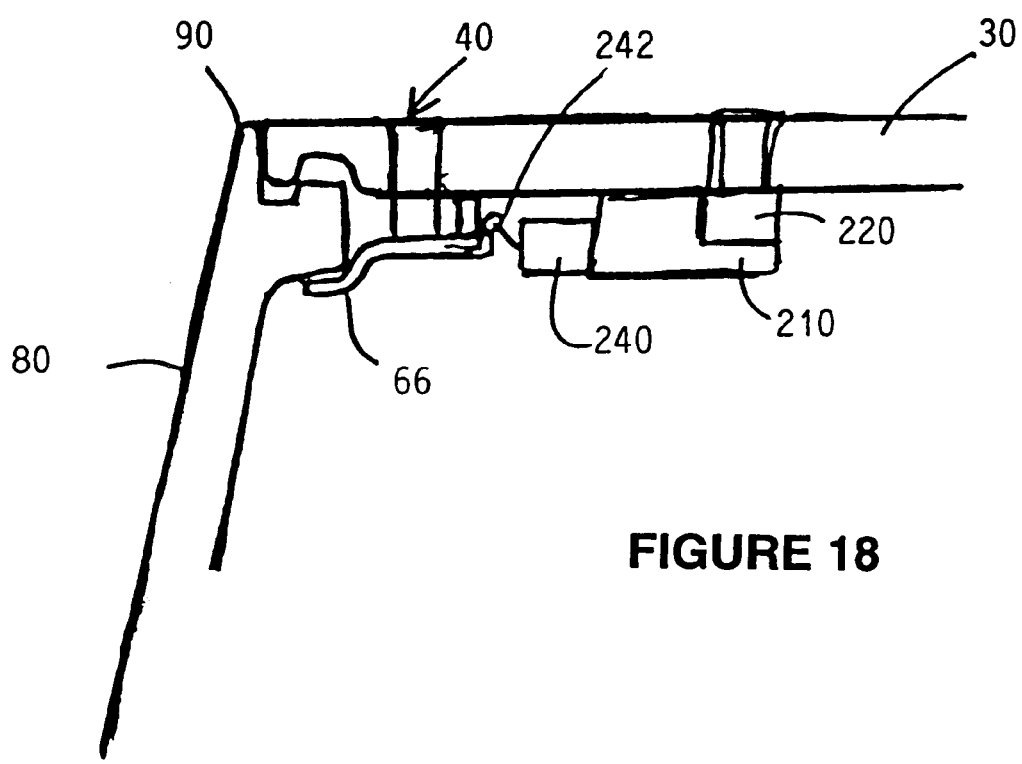
FIG. 18 is a schematic representation of the venting manifold and corresponding lock assembly.
Figure 19:
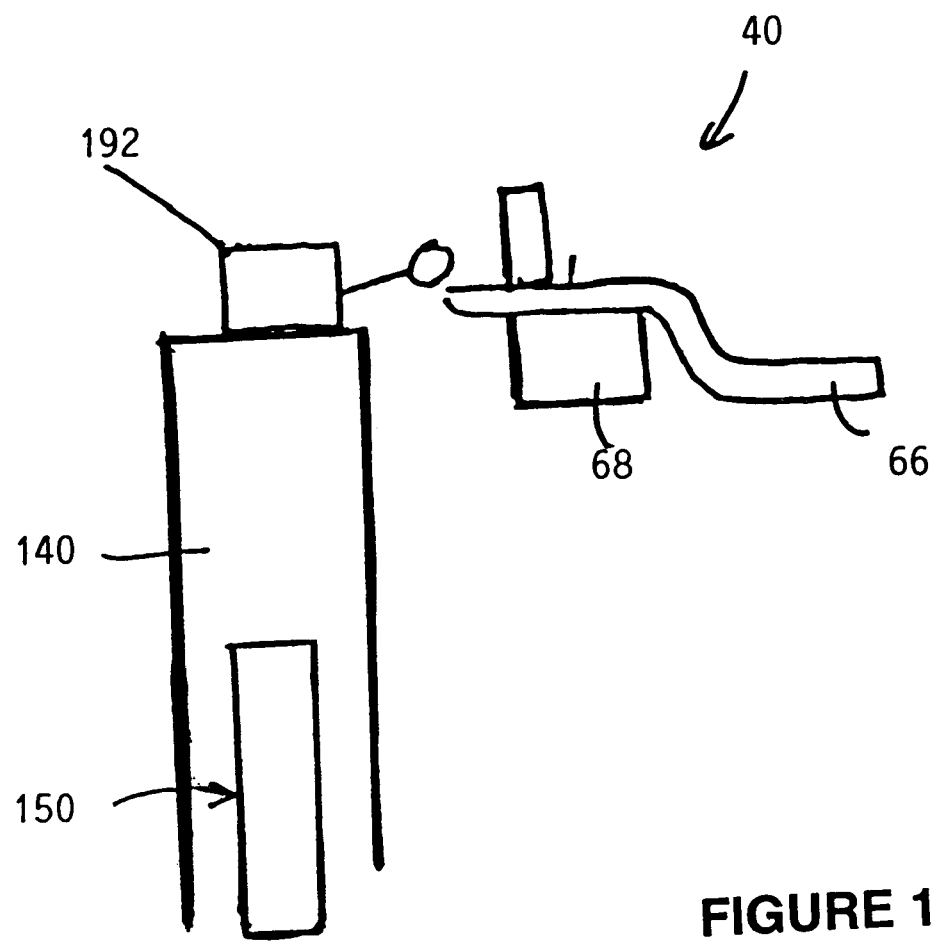
FIG. 19 is a schematic representation of the pressurizing valve and a corresponding lock assembly.
Figure 20:
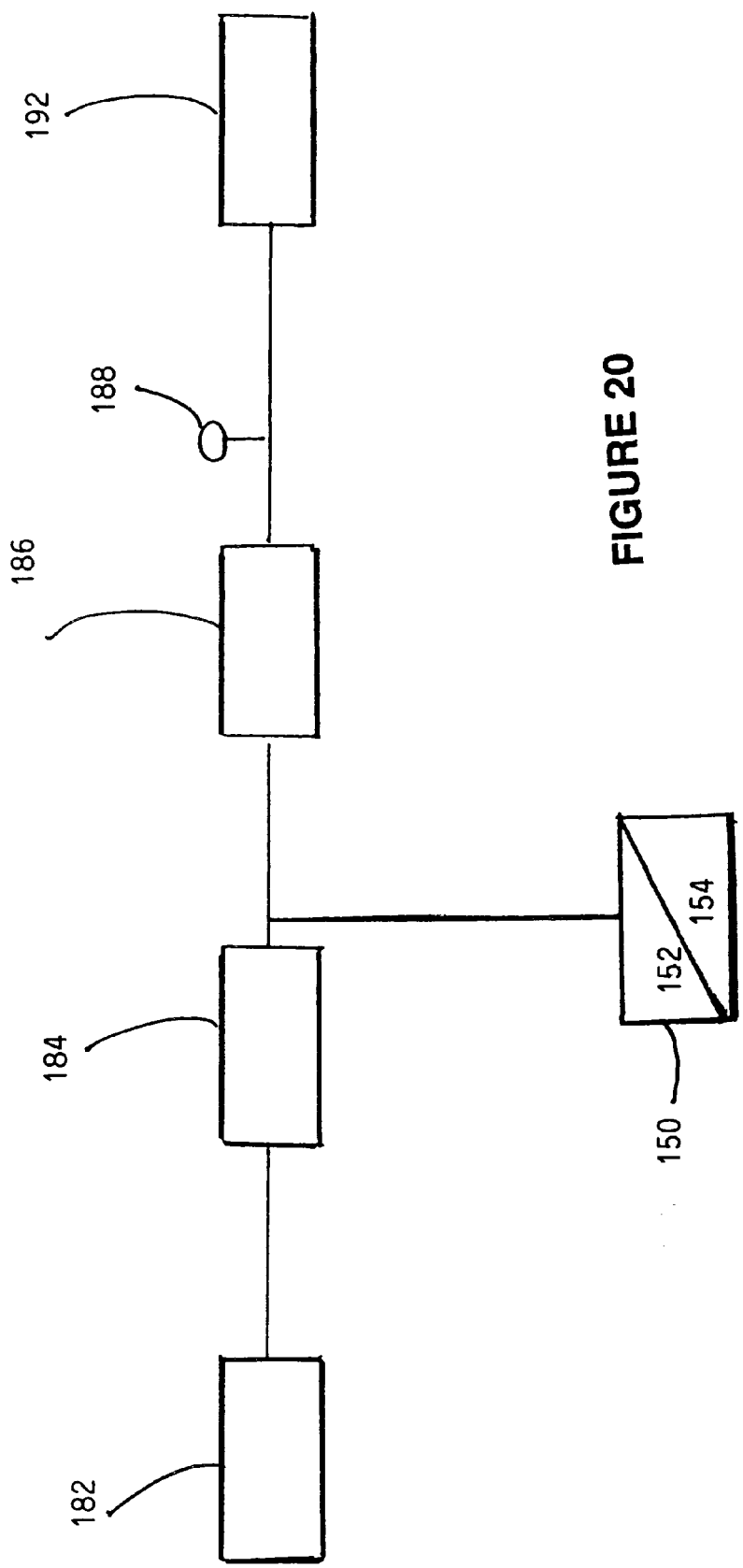
FIG. 20 is a schematic representation of the pneumatic system.

Referring to FIGS. 1 and 17, the under ground enclosure 10 of the present invention includes a cover 30, a sleeve 80 and a base plate 100 define an interior sized to enclose a vertically moveable rack assembly 140, a pneumatic system 180.

Base Plate

Figure 3:
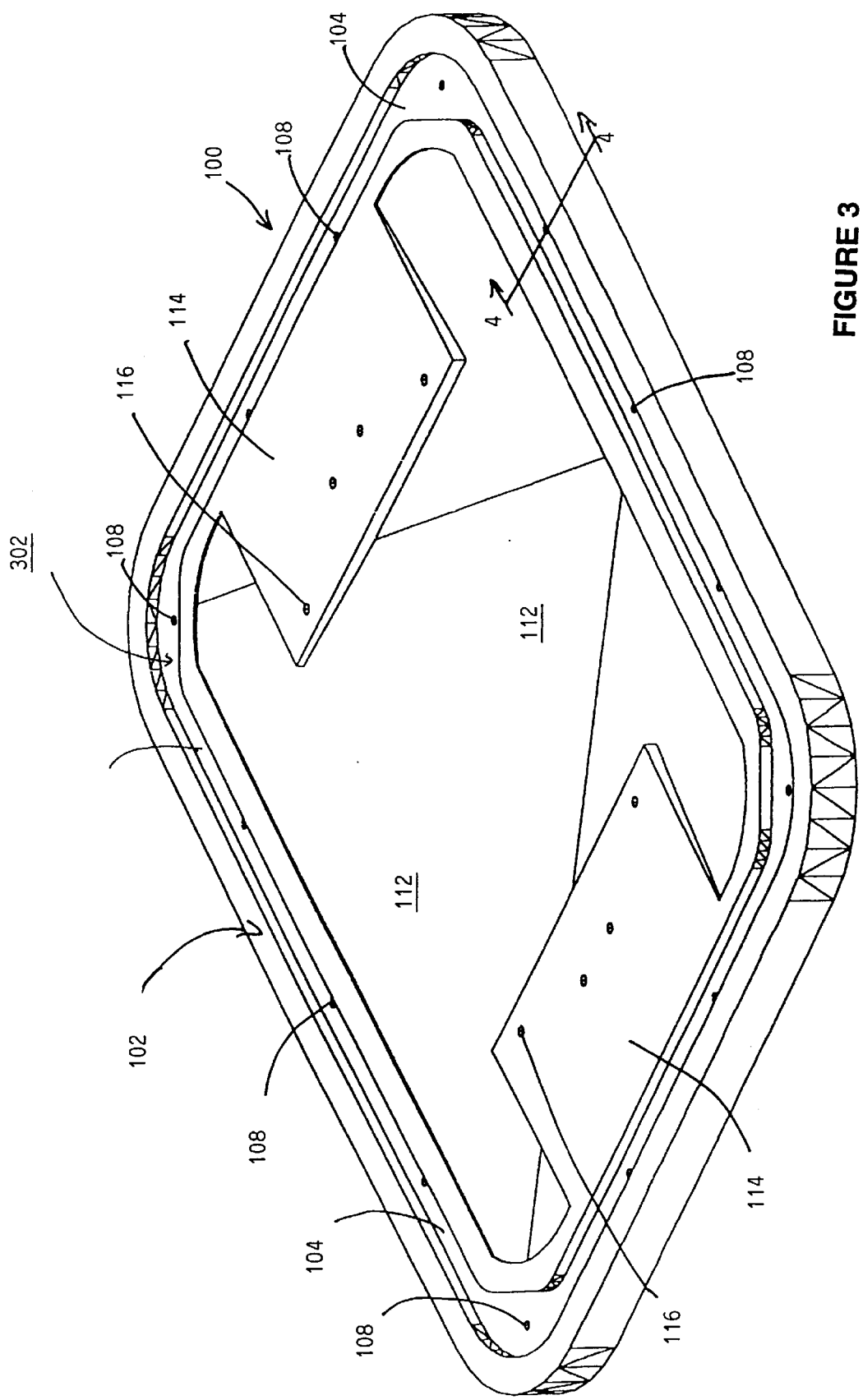
FIG. 3 is a perspective view of the base plate.
Figure 4:
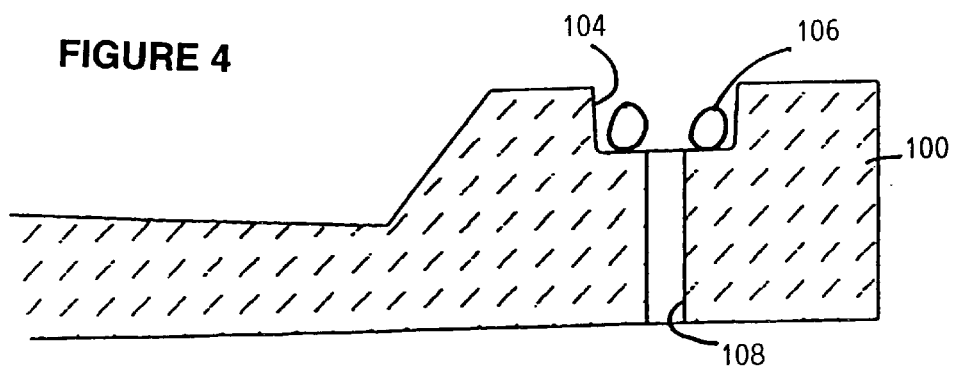
FIG. 4 is a partial cross sectional view taken along lines 4—4 of FIG. 3.
Figure 5:
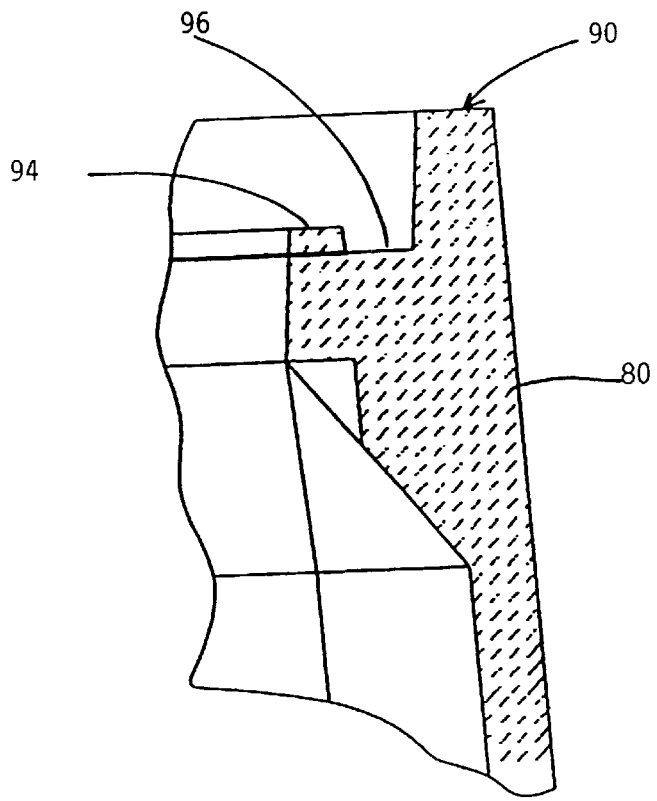
FIG. 5 is a partial cross sectional view taken along lines 5—5 of FIG. 2.

As shown in FIG. 3, the base plate 100 forms the bottom of the enclosure 10 and is a generally planar member having an upper surface 102 for cooperatively engaging the sleeve 80. The upper surface 102 of the base plate 100 includes an annular sleeve receiving groove 104 proximal to a peripheral edge of the plate. The annular sleeve receiving groove 104 thus forms a closed loop seating surface. The sleeve receiving groove 104 is sized to receive a seal 106 and includes a plurality of through holes 108 for receiving a correspondingly sized retaining bolt 110.

The base plate 100 includes water collecting surfaces 112 for concentrating any water which may enter the enclosure 10 upon opening of the cover 30 so that the water may be collected in a generally single location and easily removed.

The base plate 100 may further includes a pair of pads 114 with corresponding mounting apertures or recesses 116 for operably securing to the rack assembly 140.

The base plate 100 is formed of a polymer concrete such as that produced by Synertech Molded Products, Inc.

Sleeve

The sleeve 80 is a generally frusto pyramid shape having a narrow opening 82 and a broad opening 84. The narrow opening 82 is thus an upper opening and the broad opening 84 is a lower opening. The broad opening 84 is sized to cooperatively engage the base plate 100. Preferably, a bottom end of the sleeve 80 includes a seating ridge 86 sized to be received within the sleeve receiving groove 104 of the base plate 100. The seating ridge 86 thus provides a lower sealing surface for the sleeve 80. The sleeve 80 also includes a plurality of lock engaging surfaces 88 for contacting a lock assembly 40 to sealably retain the cover 30 with respect to the sleeve 80.

The sleeve 80 may be formed to be a variety of different heights by merely extended the distance between the narrow opening 82 and the broad opening 84 in the formation of the sleeve 80.

The upper end (top) end of the sleeve 80 includes a raised peripheral collar 90. A shoulder 92 is formed on the inside of the collar 90 and vertically offset from the collar. As shown in FIGS. 2, 5, 9 and 10, the shoulder 92 includes a stepped surface having an inner seating surface 94 and an outer seating surface 96, wherein the inner seating surface is raised above the outer seating surface. The inner seating surface 94 thus forms a first closed loop cover seating and the outer seating surface 96 forms a second closed loop cover seating. The distance from the top of the collar 90 to the inner and outer sealing surface 94, 96 is selected in conjunction with the cover 30 to dispose a top of the cover substantially coplanar with the collar. The sleeve 80 is also formed of a polymer concrete such as that produced by Synertech Molded Products, Inc.

Figure 2:
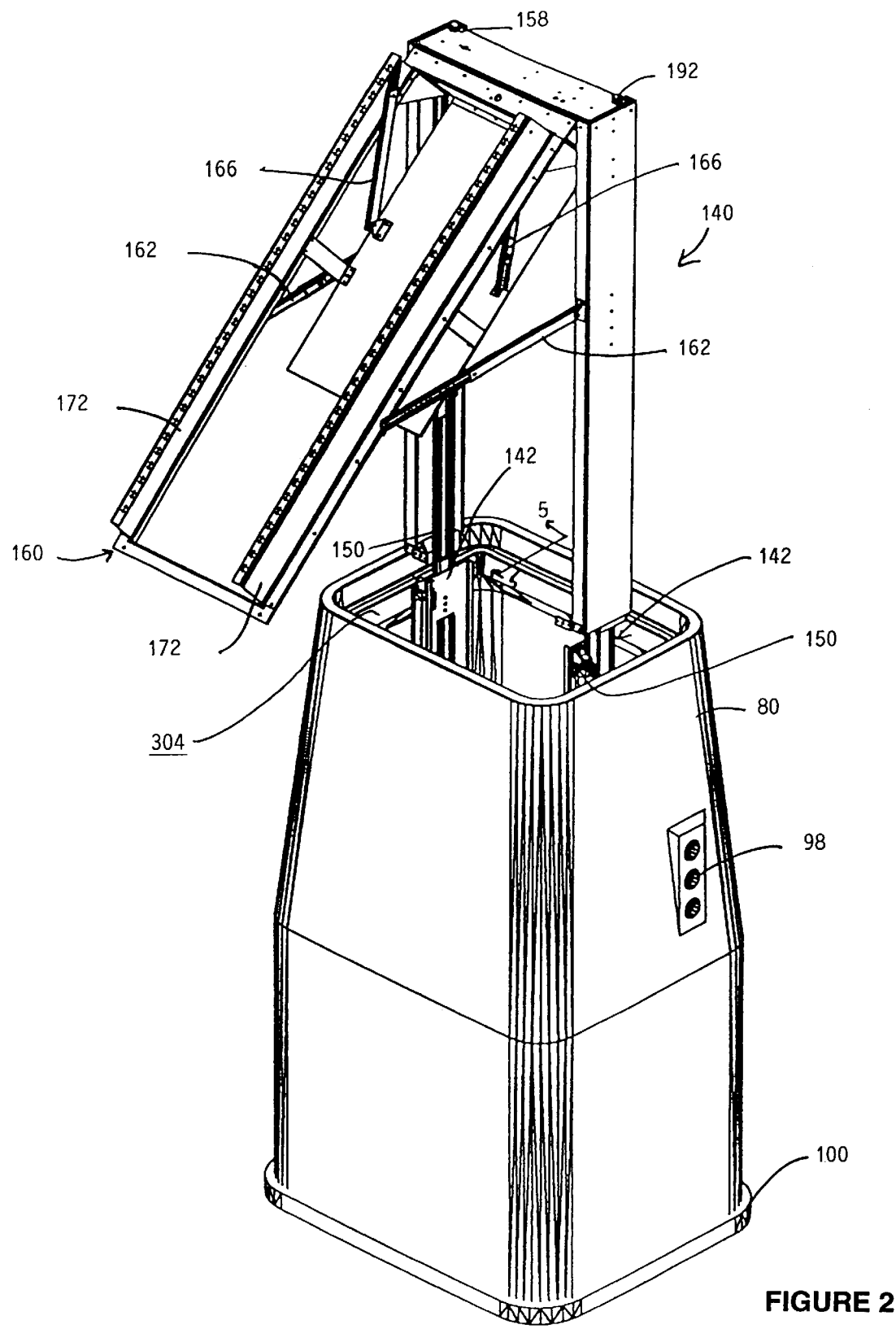
FIG. 2 is a perspective view of the enclosure in an open configuration.

Referring to FIGS. 1, 2 and 17, the sleeve 80 also includes at least one and usually a plurality of ports 98 for the passage of cables into and out of the enclosure. The ports 98 include standard PVC piping that is molded into the sleeve 80. The piping may be selected to any of a variety of lengths, as dictated by design considerations.

A cable sealing system such as that made by Roxsystem and marketed under the trademark ROXTEC may be used to provide a fluid tight communication or seal between the incoming or exiting cables and the sleeves or ducts.

It is desirous to permanently, fixedly and fluidly seal the sleeve 80 with respect to the base plate 100. The sleeve 80 is fixedly attached to the base plate 100 by a combination of adhesives, mechanical fasteners and epoxy. Specifically, a first course of adhesive strip such as Bute tape by Norton is laid in the sleeve receiving groove 104 on the base plate 100 to extend along the groove and pass on the outside edge of the through holes 108. As the tape completes a first circuit about the sleeve receiving groove 104, the tape then passes to the inside of the through holes 108 in the base plate 100.

Epoxy is then disposed into each of the through holes 108 and the sleeve 80 is seated into the sleeve receiving groove 104 and bolts 110 are passed from the bottom of the base plate 100 through the epoxy to engage the sleeve 80. The sleeve 80 and the base plate 100 are thus drawn together and the tape and the epoxy set to fill any gaps between the sleeve and the base plate.

The bolts 110 employed in securing the base plate 100 to the sleeve 80 are passed from the bottom of the base plate into the sleeve. Preferably, the heads of the bolts 110 remain spaced from an adjacent portion of the base plate 80. That is, the base plate 80 would effectively rest upon the heads of the bolts, rather than the underside of the base plate. It is believed that contact of the bolt heads and the ground, as opposed to the base plate 100 and the ground, reduces the amount of torque that may be induced through movement of the sleeve 80 and base plate. By reducing these forces, the integrity of the seal between the base plate 100 and sleeve 80 is maintained.

The sleeve 80 and the base plate 100 may enclose a plurality of fans 118 for selectively circulating pressurized gas within the enclosure 10. As the enclosure 10 is located below ground, the walls of the enclosure and surrounding earth function as a heat sink for the dissipation of undesired heat in the sealed enclosure.

Cover

As shown in FIGS. 6–10, the cover 30 is a generally planar member having a depending peripheral skirt 32. The skirt 32 projects away from the planar cover 30 and includes a pair of peripheral seal surfaces. Specifically, the cover includes an inner peripheral seal surface 34 for cooperatively aligning with the inner seating surface 94 of the sleeve 80 and an outer sealing surface 36 to cooperatively align with the outer seating surface 96 of the sleeve. The skirt 32 is sized to dispose a top of the cover 30 substantially coterminous with the top of the collar 90.

The cover 30 includes a plurality of lock apertures 33 for receiving a corresponding plurality of lock assemblies 40. At least one locator recess 37 is formed in the cover 30 adjacent each lock aperture 33. The cover 30 may also include an auxiliary input valve 38 for permitting the introduction of pressurized gas from an external source through the cover 30 to the interior of the enclosure 30.

The cover 30 is also formed of a polymer concrete such as that produced by Synertech Molded Products, Inc. The cover 30 preferably includes reinforcing elements such as re-bar to enhance the load bearing capacity of the cover.

The sealing surfaces between the cover 30 and the sleeve 80 include a resilient deformable seating material 70 and a contacting seal 72 for deforming the seating material. In the present configuration, the seating material 70 is a generally planar material and the contacting seal 72 has a generally D shaped cross sectional profile.

A satisfactory resilient deformable seating material 70 is a closed cell is foam material marketed under the trademark DEVA™ made by Norton. The D shaped seal 72 profile is a ring seal having a non-circular cross-section, wherein a flat base 74 of the profile cooperatively engages one of the cover 30 and the sleeve 80 and a rounded portion 76 of the profile, having a reduced contact area, contacts the seating material 70. Preferably, the seal 72 has greater rigidity or hardness than the corresponding DEVA™ material.

Thus, upon operable engagement of the cover 30 and sleeve 80, the reduced contact area of the rounded portion of the D profile 72 concentrates the contact force of the seal as it contacts the DEVA™ material 70. The combination of the force enhancing reduced surface area of the profile and the relative rigidity of the profile causes the seal 72 to seat and deform a local region of the DEVA™ material 70, thereby forming a temporary groove.

Preferably, the DEVA™ material has sufficient memory such that upon releasing of the D seal, even after an extended period of contact, the corresponding recess or groove formed in the DEVA™ material is removed and subsequent resealing within the exact prior alignment is not required.

Further, it has been found that the combination of elements forming the seal between the cover 30 and the sleeve 80 are such that they function as a secondary pressure relief valve. Upon excess pressure in the enclosure 10, the seals will locally fail permitting the excess pressure in the interior of the enclosure to vent between the cover 30 and the sleeve 80 around the seals.

Lock Assembly

Figure 8:
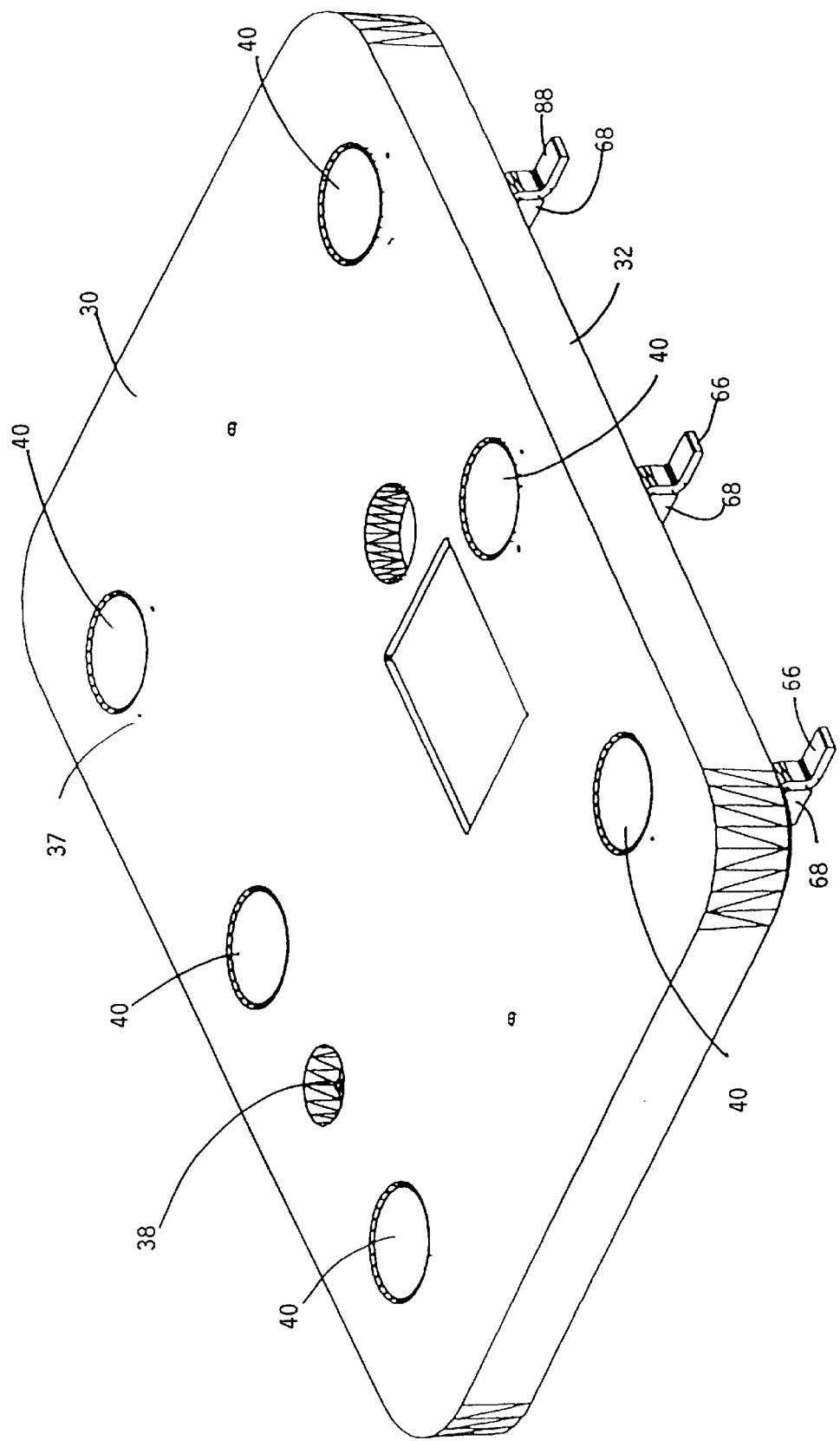
FIG. 8 is a perspective view of the cover showing a plurality of lock assemblies attached to the cover.
Figure 9:
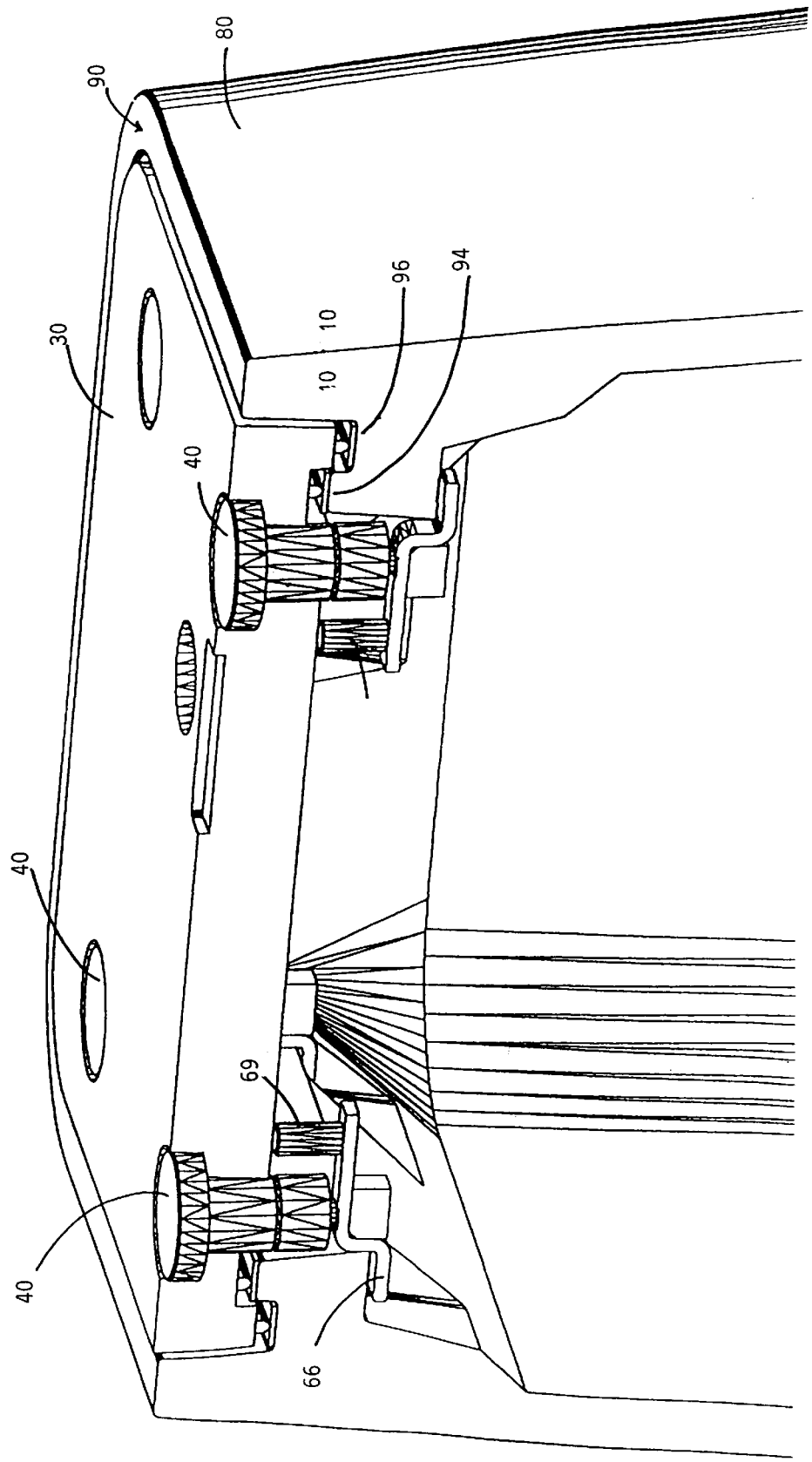
FIG. 9 is a perspective, partial cross sectional view taken along lines 9—9 of FIG. 1.
Figure 10:
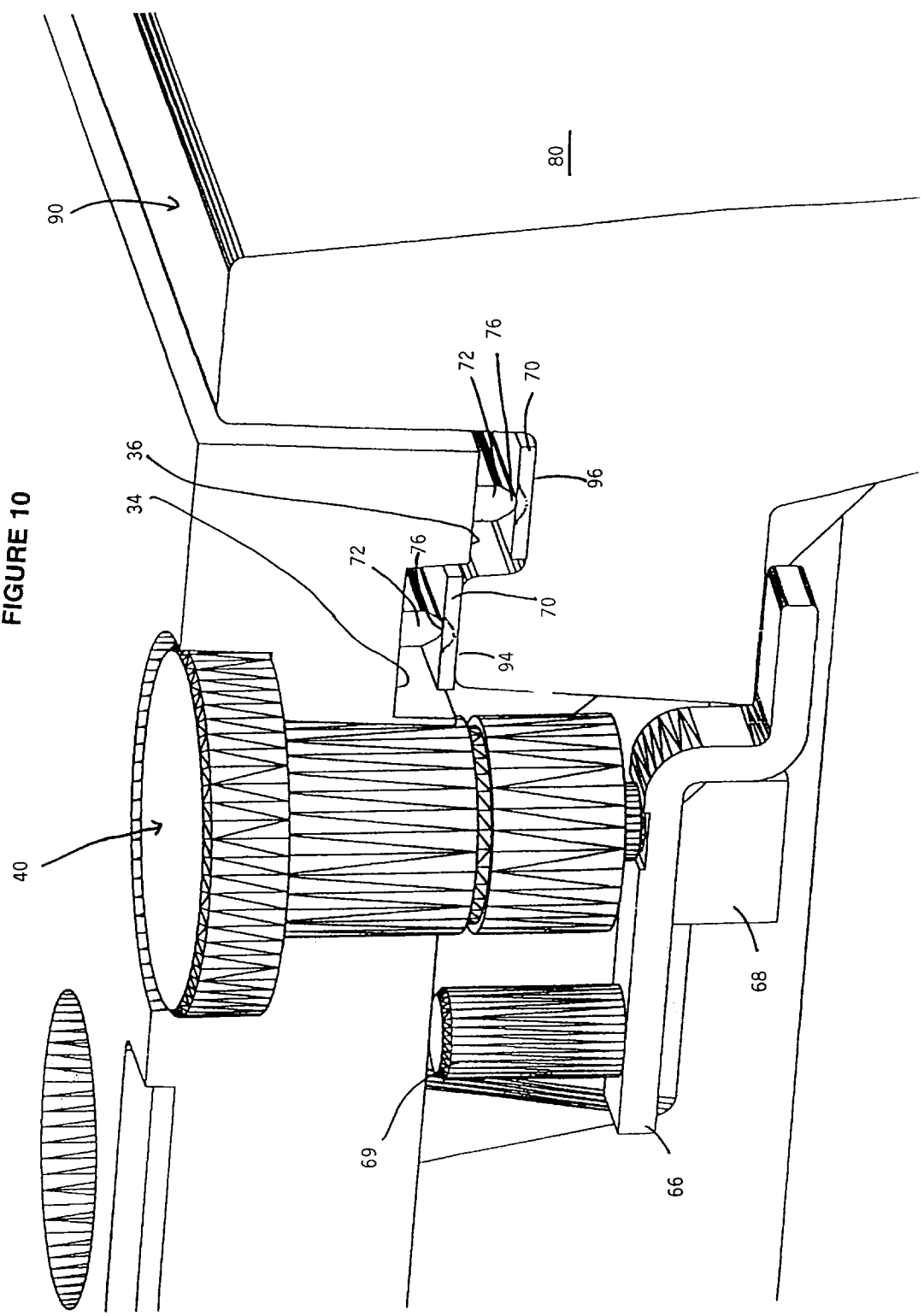
FIG. 10 is an enlarged perspective, partial cross sectional view taken along lines 10—10 of FIG. 9.
Figure 11:
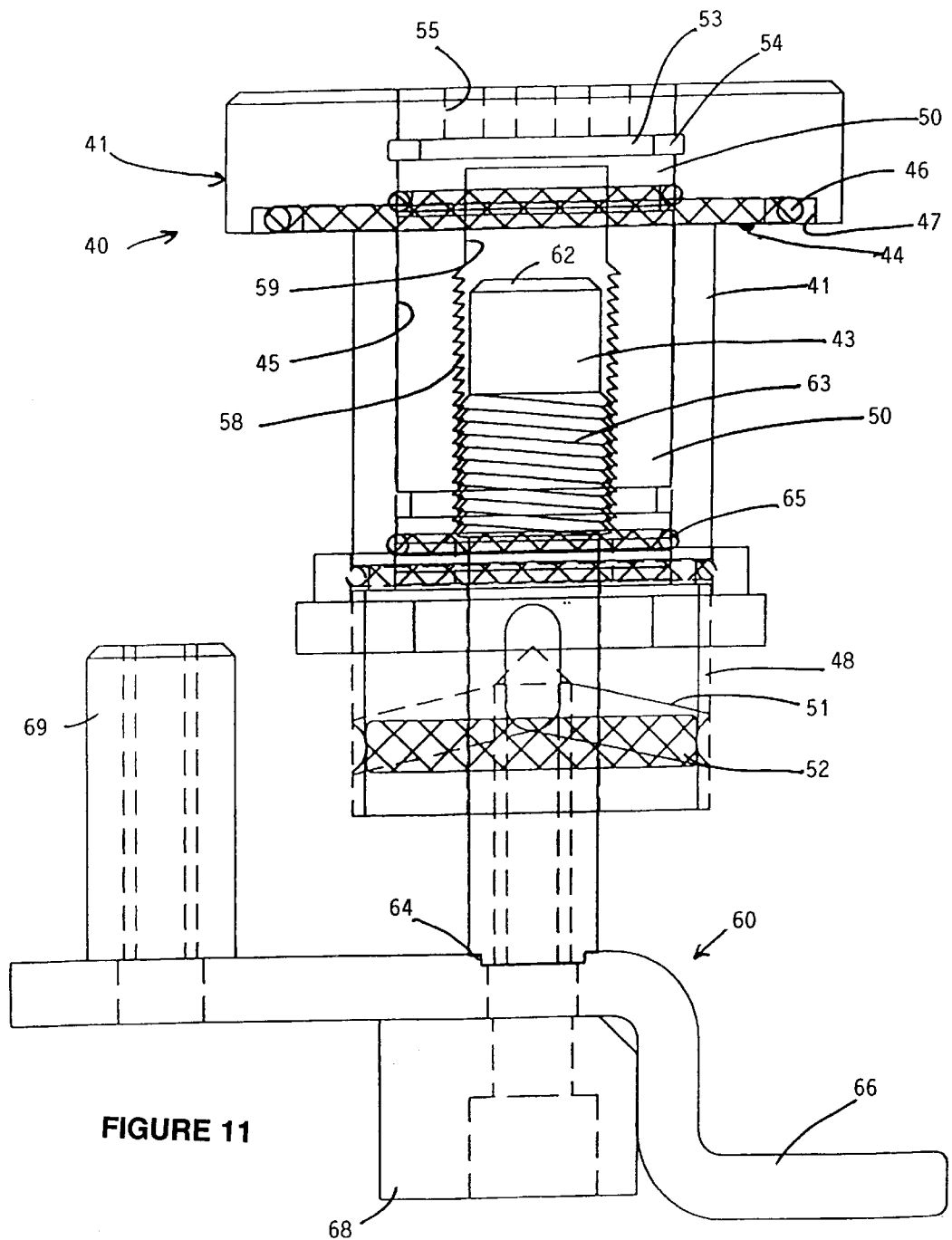
FIG. 11 is a side elevational cross sectional of a lock assembly in an open position.
Figure 12:
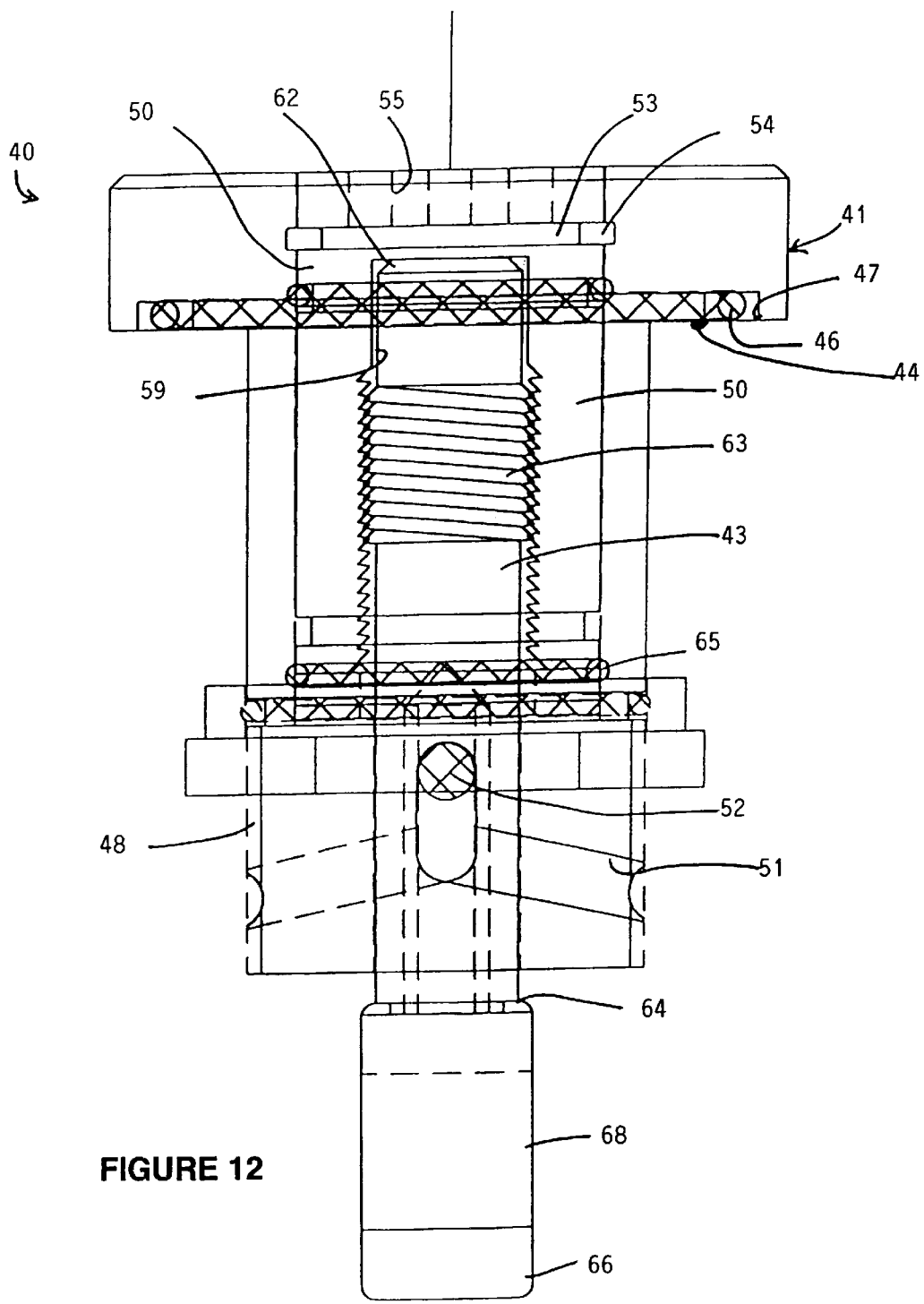
FIG. 12 is a side elevational cross sectional of a lock assembly in a closed position.

As shown in FIGS. 1 and 8, a plurality of lock assemblies 40 are employed to releasably retain the cover 30 and the sleeve 80. The lock assemblies 40 are connected to the cover 30 as they are seated in the corresponding lock apertures 33. Referring to FIGS. 11 and 12, generally, each lock assembly 40 includes an outer shell 41, a driver 50, a driven shaft 43 and a paw assembly 60. In a preferred embodiment, the six lock assemblies 40 are employed as shown in the figures. As the lock assemblies 40 are identical, only a single lock is described for purposes of description.

Figure 6:
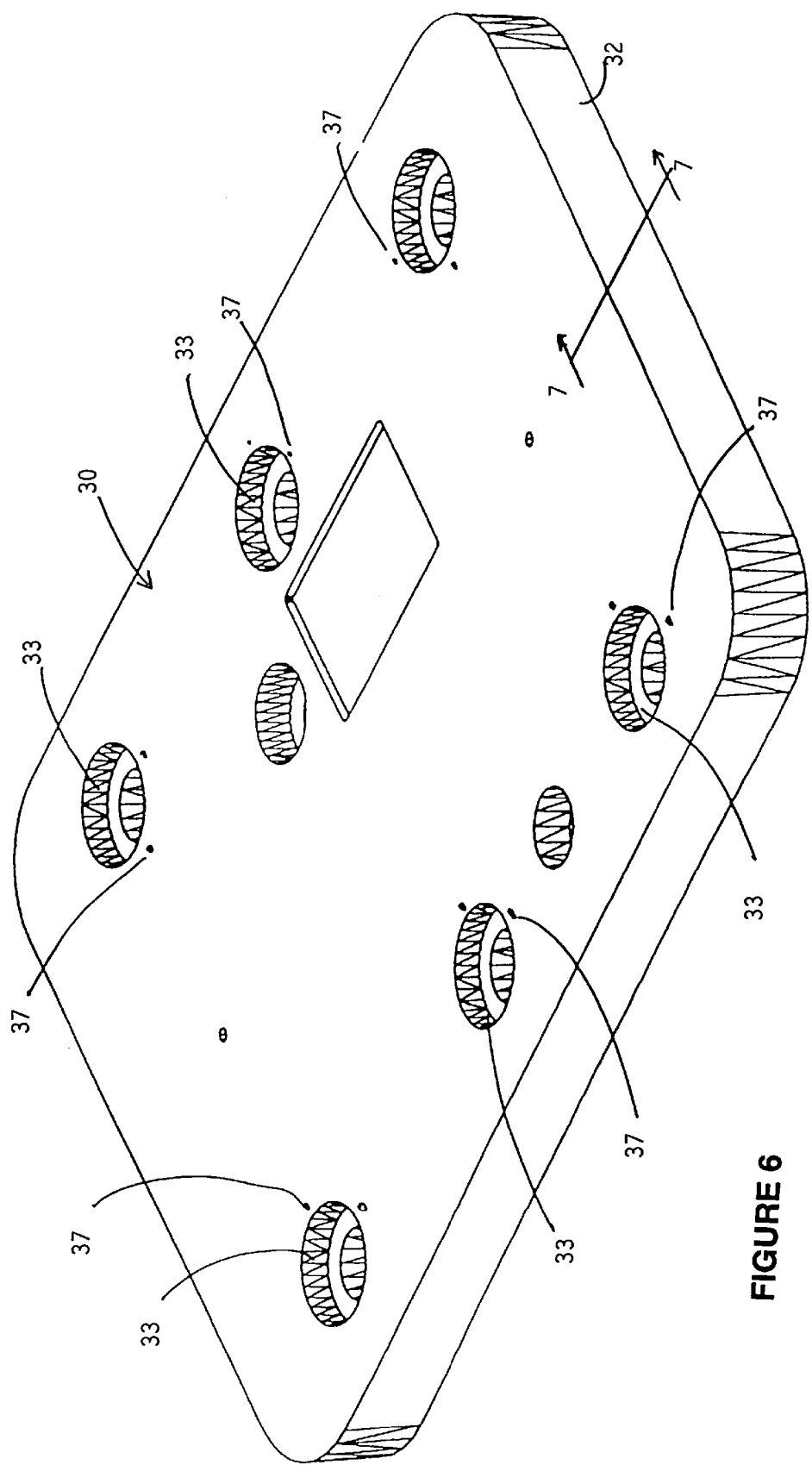
FIG. 6 is a perspective view of the cover.
Figure 7:
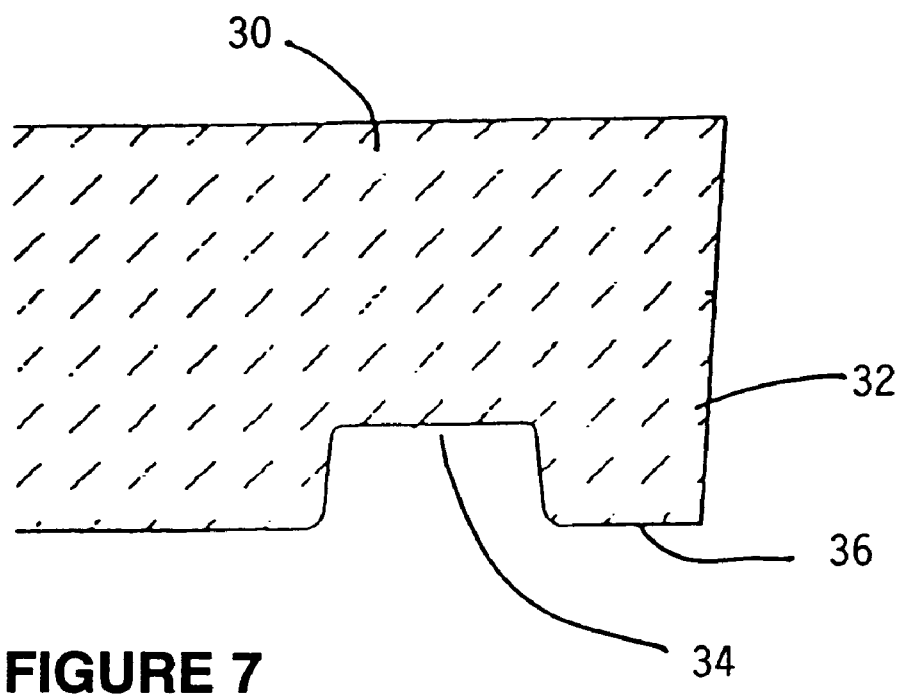
FIG. 7 is a partial cross sectional view taken along lines 7—7 of FIG. 6.

Referring to FIGS. 1, 6 and 8, the outer shell 41 is fixedly attached to the cover. The outer shell 41 has a generally T shaped side elevational profile with an upper head portion and a depending cylindrical portion which is received within a corresponding aperture 33 in the cover 30. The outer shell 42 includes a central passage 45 extending through the head portion and the cylindrical portion. An underside of the head portion includes locator pins 44 for cooperatively engaging the locator recesses 37 in the cover 30.

The underside of the head portion of the outer shell 41 also includes an annular groove or recess 47 for cooperatively retaining an O-ring 46 such that upon cooperative engagement of the lock assembly 40 and the cover 30, fluid communication between the cover and the outer shell is precluded.

A bottom length of the cylindrical portion of the outer shell 41 includes external threads 48. A washer and a nut 49 are threadingly engaged on the external threads 48 to trap and retain a portion of the cover 30 intermediate of these portions of the lock assembly 40.

The threaded section 48 of the outer shell 41 includes a key-way 51 cut in the threads such that upon rotation of the driver 50 and induced rotation of an actuating pin 52 in a first direction, the actuating pin contacts one end of the key way and upon rotation of the driver in an opposite direction, the actuating pin contacts a second end of the key way.

The driver 50 is rotatably mounted in the central passage 45 for rotation with respect to the fixed outer shell 41. Preferably, the driver 50 is cooperatively engaged with the outer shell 41 by a lock ring 54 and corresponding recess 53 in the outer shell and the driver.

A top of the driver 50 is mounted to be substantially flush with an adjacent section of the head portion. The top of the driver 50 includes recesses or surfaces for releasably engaging a turning tool. Preferably, an upper surface of the driver 50 includes a torque transferring surface 55 which is preferably recessed. It is understood this configuration may be any of a variety known in the art, as well as that shown in the drawings.

The driver 50 includes a peripheral groove 57 for seating an O-ring 56 which in turn contacts the wall of the central passage 45 in the outer shell 41 to provide a sealed relation therebetween. The driver 50 is fixed in its vertical position with respect to the outer shell 41, but may rotate freely with respect to the outer shell. That is, though the driver 50 rotates, the driver maintains a constant absolute vertical position with respect to the outer shell 41.

The driver 50 includes a central blind recess 59 threaded with a plurality of thrust bearing threads (buttress threads) 58. The buttress threads 58 provide a load bearing contact surface substantially perpendicular to a longitudinal axis of the recess 59. Specifically, the load bearing contact surface of the buttress threads 58 is oriented to contact corresponding threads when a load is placed upon the driver 50.

The elongate driven shaft 43 cooperatively engages the driver 50. The driven shaft 43 includes a captured end 62 and a terminal end 64. The driven shaft 43 also includes a threaded section 63 intermediate of the captured end 62 and the terminal end 64. The threaded section 63 is configured to cooperatively engage the buttress threads 58 of the driver 50. The driven shaft 43 also includes an actuating pin 52 axially spaced from the threaded section 63.

A thrust bearing 65 is disposed on the driven shaft 50 intermediate of the actuating pin 52 and the threaded section 63 to provide for rotational contact between the outer shell 41 and the actuating pin 61 (and driven shaft). The thrust bearing 65 permits rotation of the drive 50 relative to the outer shell 41 under loaded conditions. The terminal end 64 of the driven shaft 43 includes a threaded recess 67.

Referring to FIGS. 11 and 12, a lock paw 66 and thrust block 68 are connected to the driven shaft 43 by a bolt passed through each of the thrust block and the lock paw and threadingly engaged with the threaded recess 67 in the terminal end 64 of the driven shaft.

Due to space considerations, the lock paw 66 is formed in a generally elongate Z-configuration and the thrust block 68 is cooperatively engaged with the driven shaft 43 and the lock paw along the middle portion of the Z to preclude deformation of the lock paw upon high loading environments. The lock paw 66 includes a sleeve contacting end and a counter force end, wherein the lock paw is connected to the driven shaft 43 intermediate of the sleeve contacting end and the counter force end. The counter force end includes a stabilizer 69 extending from the lock paw 66 to contact the underside of the cover 30 such that upon cooperative engagement of the lock paw 66 and the sleeve 80, the vertical force exerted through the driven shaft 43 does not torque or twist the lock paw with respect to the outer shell or the driver. That is, side loading on the lock paw 66 is minimized.

Preferably, the lock paw 66 is formed of A-2 steel with a titanium nitride coating. The lock paw 66 is hardened to a 48–50 on the Rockwell C Scale. The titanium coating provides increased resistance to surface oxidation as well as providing a wear surface during operation of the lock paw 66 with respect to the sleeve 80.

In the lock assembly 40, the lock is vertically moveable between a load and no load configuration, wherein in the no load configuration, the lock paw 66 may be rotated with respect to the sleeve 80. In the load configuration, the lock paw 66 is vertically translated so as to capture a portion of the sleeve 80 to retain the cover 30 with respect to the sleeve.

Rack Assembly

Referring to FIGS. 2 and 17, the rack assembly 140 includes a pair of vertically extendible columns 142 controllable pneumatic cylinder assemblies 150 and a rack 160 mounted to the columns.

The columns 142 may be formed by a variety of members such as an interlocking telescoping members, U-shaped members, tubes or brackets. Preferably, each column 142 is fixedly attached to the base plate 100 at the pads 114 and includes a five sliding sections. The columns 142 are vertically actuated by the pneumatic cylinder assemblies 150. The cylinder assemblies 150 are fluidly connected to the pressurized gas source through a control valve 156. The control valve 156 is a hand operated valve for selectively exposing the pneumatic cylinder assemblies 150 to the pressurized gas from the source.

Each column 142 includes a cylinder assembly 150 having a primary pneumatic cylinder 152 and a secondary pneumatic cylinder 154. These cylinders 152, 154 are controllable for both movement from a retracted to an extended position and movement from the extended to the retracted position. In addition, an auxiliary actuating air supply valve 158 may be connected to the top of the equipment rack 160 and extends to each cylinder assembly 150 so that upon a failure of the pressurized gas source, the columns 142 may be extended to raise the rack out of the enclosure to permit access to the rack or the interior of the enclosure. The auxiliary actuating air supply valve 158 may be one common in the industry, such as a Schrader valve.

The rack 160 is disposed between the two columns 142 to be vertically moveable from a retracted position with in the sleeve 80 to an extended position locating at least a portion, and preferably the entire rack above the sleeve. The rack 160 is connected to the columns 142 to be pivotally disposed from an in-line position substantially coplanar with the columns to a work position spaced from the columns. A pair of spacing arms 162 are connected to the columns 142 and the rack 160 for selectively retaining the rack in the spaced apart position. The rack 160 also includes a back panel 164 and a pair of back arms 166 connected to the rack and to the back panel for selectively moving the back panel from an in-line position with the rack to an extended position spaced from the rack.

The top of the columns and rack define a contact surface 168.

Although the rack 160 and the columns 142 may be any of a variety of sizes, in the present configuration, the rack and columns are configured to support an industry standard 23 inch equipment rack. Further, the rack 160 may include standoffs 172 to support a 19 inch equipment rack.

Pneumatic System

Referring to FIG. 17, the pneumatic system 180 includes a pressurized gas source 182, a first stage pressure regulator 184, a second stage pressure regulator 186, a venting manifold 210, and associated tubing and valving. The pneumatic system 180 is employed to pressurize the interior of the enclosure 10 and assist in movement of the rack 160 from the retracted to the extended position. That is, the pressurized gas source 182 is selectively connected to the interior of the enclosure 10 as well as the gas cylinder assemblies 150.

The pressurized gas source 182 includes a first tank and a second tank fluidly connected to the first stage regulator 184. The first tank and the second tank are pressurized with nitrogen at approximately 2,200 psi.

A regulator assembly includes the first stage pressure regulator 184 and the second stage pressure regulator 186. The first stage regulator 184 may take the pressurized gas from the supply at 2200 psi and provides an output gas pressure of approximately 150 psi. A supply line extends from the outlet of the first stage regulator 184 to the gas cylinder assemblies 150 of the extendible columns 142. Thus, 150 psi gas is fluidly connected to the gas cylinders 152, 154 for translating the rack 160 between the retracted and the extended position. The line extending from the first stage pressure regulator 184 to the cylinder assemblies 150 includes sufficient T connectors and splits to operatively connect each of the cylinders 152, 154 to the pressure source.

Movement from the retracted position to the extended position and movement from the extended position to the retracted position is controlled pneumatically through the cylinder assemblies 150. Therefore, pneumatic lines are provided to the cylinders 152, 154 to cause movement from the extended to the retracted position.

The supply line from the first stage regulator 184 to the rack actuating control valve 156 includes a one way valve. The one way valve permits an auxiliary introduction of a pressurized gas to move the columns 142 between the retracted and the extended positions. The one way valve precludes the auxiliary gas pressure from bleeding toward the interior pressurized gas source, so that the auxiliary pressure acts on the cylinder assemblies and not against the first stage regulator 184.

The second stage pressure regulator 186 is also connected to the outlet of first stage regulator 184 and the secondary pressure regulator steps the pressure from a 150 psi to approximately 5 psi. The output of the secondary pressure regulator 186 is conducted through a line to a pressurizing valve assembly 192.

A pressure sensor 188 is fluidly connected to the second stage pressure regulator 186 to monitor the pressure of the gas passing from the second stage regulator. It is understood the pressure sensor 188 could be located at alternative locations to provide a pressure monitoring function. In a preferred embodiment, the pressure sensor 188 is selected to provide an alarm upon pressure from the second stage regulator 184 dropping to less than 3.5 psig.

The venting manifold 210 is cooperatively connected to the cover 30 and does not include any lines to the pressurized gas source 182, the sleeve 80, the base plate 100, the columns 142 or the rack 160. The venting manifold 210 includes a pressure relief valve 220 and a venting valve 240.

The venting valve 240 is actuated by an arm 242 to be moved between a closed (locked) position and an (open) unlocked position. In the closed position, fluid communication from the interior of the enclosure 10 to the ambient atmosphere is precluded. In the open (unlocked) position, fluid communication is permitted from the interior of the enclosure 10 to the ambient atmosphere or exterior of the enclosure. The venting valve 240 is configured to have a default configuration wherein the valve is in the open position. The arm 242 is sized to cooperatively engage a particular lock assembly 40.

The venting valve 240 is actuated upon translation of the paw 66 of the particular lock assembly 40 in the loaded position to a locked configuration. That is, vertical travel of the lock paw 66 contacts the arm 242 of the venting valve 240 and the venting valve is moved from the open position to the closed position, thereby precluding fluid flow from the interior to the exterior of the enclosure 10 through the manifold 210. In the closed position, the interior of the enclosure 10 may be pressurized. Conversely, as the lock paw 66 travels vertically in the locked orientation from a locking relation with the sleeve 80 to an unlocked position (non contacting with the sleeve) the venting valve arm 242 goes to the default position (the venting position) and pressurized gas in the interior is permitting to pass through the venting valve 240 to the exterior.

The pressure relief valve 220 is also connected to the manifold 210 and is fluidly exposed to the interior of the enclosure 10 and vents to an ambient or atmospheric pressure. The pressure relief valve 220 may be any of a variety known in the art and is preferably selected to bleed pressure at approximately 8.5 psig. As the manifold 210 includes the pressure relief valve 220, a relatively high pressure external source may be used to pressure the interior as the manifold will bleed off any pressure above the preset limit (8.5 psig).

The pressure relief valve 220 is further selected such that upon an interior pressure of 3.5 psig, the pressure relief valve closes so that complete venting of the enclosure 10 is precluded. That is, the interior of the enclosure 10 will remain at a pressure of least 3.5 psig. The approximately 3.5 psig is sufficient to withstand approximately 7 feet of water head against the seals.

That is, by balancing the forces on opposing sides of the seals between the cover 30 and the sleeve 80, the respective seal is able to withstand greater pressures. While the seals between the cover 30 and the sleeve 80 may have an upper limit of the pressure differential that can be supported, by raising the pressure in the interior of the enclosure 10, the sustainable pressure on the outside of the enclosure correspondingly increases.

The pressurizing valve assembly 192 is attached to the equipment rack 160 and hence extendible columns 142. The pressurizing valve assembly 192 is connected to the columns (rack) so that upon removal of the cover 30, the pressurizing valve assembly 192 is not disconnected, nor are the lines connected to the pressurizing valve assembly set under tension. The pressurizing valve 192 is movable between an open position and a closed position, wherein the closed position is the default position. An inlet 194 to the pressurizing valve assembly 192 is fluidly connected to the pressurized gas source 182 (through the pressure regulators 184, 186). An outlet 196 of the pressurizing valve assembly 192 empties into the enclosure 10 interior. This pressurizing valve assembly 192 is actuated by the same particular lock assembly 40 as the venting valve 240. Upon translation of the lock paw 66 to the loaded position (vertically) the pressurizing valve assembly 192 is moved from the default closed position to the open position, and is thereby actuated to permit passage of the pressurized gas through the pressurizing valve to the interior of the enclosure 10. Although a variety of design considerations can be accommodated in selecting the particular pressurizing valve assembly threshold, a preferred value is 5 psig.

Preferably, the pressurizing valve assembly 192 is actuated only upon a sufficient loading of the lock assembly 40 and hence sealing of the cover 30 to the sleeve 80 to provide pressurizable interior.

Preferably, the pressurizing valve 192 is disposed on the top of the rack 160, as the top of the rack may be used to operatively locate the pressurizing valve adjacent the actuating lock assembly 40. Thus, as the particular actuating lock assembly 40 is translated in the load position, the pressurizing valve assembly 192 is actuated and pressurized gas is introduced into the enclosure 10. Simultaneously, the venting valve 240 is actuated to preclude the bleeding of pressure through the venting valve.

Conversely, the valving and lock assembly 40 cooperates such that upon moving one of the plurality of locks from the lock position to the open position, the pressurized gas in the interior of the enclosure 10 is vented to atmospheric or ambient pressure.

Therefore, the pressurized gas source 182 is selectively exposed to the interior of the enclosure 10 such that upon locking the cover 30 to the sleeve 80 and sealably defining the interior, pressurized gas is released from the source 182 to the interior of the enclosure to place the interior of the enclosure at a positive pressure with respect to the surrounding ambient or atmospheric pressure. As determined by the pressurizing valve assembly, the interior of the enclosure is pressurized to approximately 5–6 psig in the closed or locked configuration.

In addition, the pressurized source 182 is selectively connected to the pneumatic cylinder 150 assemblies on the extendible columns 142 such that gas from the pressurized source may be used to move the rack 160 from the retracted to the extended position.

Monitor/Alarm System

The present invention further includes a monitoring and alarm system 260 having a transmitter 262 which may transmit any of a variety of electromagnetic signals including low-band, high band, ultra high band, radio, coaxial, twisted pair copper, or direct fiber optic communication to a central receiving station. The monitoring and alarm system 260 is operably connected to the pressure sensor 188. Thus, if a pressure failure is registered by the pressure sensor 188, a signal is sent to the monitoring and alarm system 260 and an alarm signal is then transmitted to the central station. Proper remedial or corrective action can then be taken, with the object of such action before failure of the system.

In addition, the monitoring system 260 includes a heat sensor 264 for detecting and monitoring the temperature inside the enclosure 10. The monitoring and alarm system 260 is operably connected to the fans 118 for circulating the pressurized gas in the enclosure 10 and enhance thermal transfer from the enclosed (gas) to the walls of the sleeve 80 and hence to the surrounding ground.

Power for the monitoring and alarm system 260 may be supplied from a variety of sources. The power may be drawn from an on-line power line passing through the housing or an alternative source such as solar energy as rechargeable batteries in the enclosure 10.

Method of Operation

In operation, a hole is formed in the ground and the base plate 100 and sleeve 80 are disposed in the hole such that the collar 90 is substantially coplanar with the surrounding ground level. Cables are introduced through corresponding ports 98 in the sleeve 80 and are sealed by means well known in the art. The cables are cooperatively engaged with the rack 160 and sufficient slack is disposed between the rack and the sleeve 80 to permit the rack to be translated from the retracted to the extended position. As the volume of the sleeve 80 is usually insufficient to accommodate the rack 160 and an operator, the pneumatic cylinder assemblies 150 are actuated with an external pressure source and the rack is disposed outside the sleeve. Ample access is thus provided for working on the rack 160, the cables and any equipment located on the rack.

The rack 160 is then lowered into the sleeve 80 as the columns 142 are compressed. The cover 30 is then set onto the sleeve 80 so that the corresponding seating surfaces align and the top of the cover 30 is flush with the top of the collar 90 on the sleeve 80.

The lock assemblies 40 are actuated to secure the cover 30 relative to the sleeve 80. The lock assembly 40 that interacts with the venting manifold 210 and the pressurizing valve assembly 192 is actuated after the remaining lock assemblies. As the last lock assembly is actuated, the pressurizing valve 192 is opened thereby permitting pressurized gas from the second stage regulator 186 to pass through the pressurizing valve 192 and to the interior of the enclosure 10. As the pressure of the gas from the second stage regulator 186 is at a predetermined value (below that of the pressure relief valve 240, the enclosure 10 is pressurized until the pressure in the enclosure is the predetermined value from the second stage regulator. In the present configuration, the second stage regulator 186 and hence enclosure 10 pressure is 5 psig.

Preferably, there are no leaks for the pressurized gas in the enclosure 10 that bleed pressure to the ambient atmosphere. However, if there is some bleeding, upon the pressure dropping below the predetermined 5 psig, pressurized gas will pass from the second stage regulator 186, through the pressurizing valve 192 and to the interior of the enclosure 10.

The internal pressurized gas source 182 thus maintains the enclosure 10 at a positive pressure. However, if the pressure sensor 188 detects that the pressure of the gas exiting from the first stage regulator 184 is less than 3.5 psig, then an alarm signal is sent to the central station.

To open the enclosure, the last locked lock assembly is the first lock assembly to be opened. As this lock assembly 40 is loosened and the lock paw 66 travels vertically downward, the venting valve arm 242 that rests on the lock paw is correspondingly moved downward to the default open position. The downward motion of the venting valve arm 242 opens the venting valve 240 to provide fluid communication between the interior of the enclosure 10 and the ambient environment. The enclosure 10 is thus vented and pressure acting on the top of the cover 30 is substantially equal to the pressure acting on the underside of the cover.

The remaining lock assemblies are moved to the unlocked position. and the cover 30 may be completely removed from the sleeve.

The control valve 156 is then operated by hand to introduce pressurized gas from the first stage pressure regulator 182 to the pneumatic cylinder assemblies 150. This pressure causes the columns 142 to extend and the rack 160 to raised out of the sleeve 80. An operator may then perform tasks on the equipment and cables.

If an external pressurized gas source is readily available, or the internal source is low, depleted or sought to be conserved, the auxiliary actuating air supply valve 158 may be used to supply pressure to the control valve 156 and hence raise and lower the columns 142 and rack 160.

The present invention thus provides a self contained sealable and pressurizable underground enclosure 10 that creates a stable, monitored and dry environment for cable system components. In addition, the present invention is able monitor the conditions within the enclosure 10 and provide feedback to a central station to reduce reactive repairs while allowing for accurate preventative maintenance.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

In the claims:

1. A below ground cable management system, comprising:
   (a) a base having a closed loop seating surface;
   (b) a sleeve having an upper opening and a lower opening, the upper opening being smaller than the lower opening;
   (c) a lower sealing surface on the sleeve, the lower sealing surface sized to align with the closed loop seating surface upon cooperative engagement of the base and the sleeve;
   (d) a peripheral collar at the upper opening of the sleeve;
   (e) a first closed loop cover seating surface spaced from the collar by a first distance;
   (f) a second closed loop cover seating surface spaced from the collar by a second distance, the second distance being greater than the first distance;
   (g) a cover having a planer top and a depending skirt;
   (h) a first closed loop sealing surface on the skirt, sized to cooperatively align with the first cover seating surface;
   (i) a second closed loop sealing surface on the skirt sized to cooperatively align with the second cover seating surface;
   (j) a first seal for contacting the first sealing surface and the first cover seating surface;
   (k) a second seal for contacting the second cover seating surface and the second sealing surface;
   (l) a plurality of locks connected to the cover for releasably retaining the cover to the sleeve with a sufficient force to sustain a positive pressure within the sleeve;
   (m) a rack sized to be received through the upper opening; and
   (n) an actuator connected to the rack and the base for selectively disposing the rack between a retracted position within the sleeve and an extended position disposing a portion of the rack above the upper opening.

2. The below ground cable management system of claim 1, wherein at least one of the first and the second seal has a cross section profile defining a contact base for contacting one of the corresponding seating surface and sealing surface and a reduced contact area for contacting the remaining of the corresponding seating surface and sealing surface.

3. A below ground cable management system, comprising:
   (a) a below ground enclosure having an upper opening;
   (b) a cover sized to sealingly engage the enclosure to define a pressurizable interior and sustain a pressure greater than ambient pressure in the interior;
   (c) a rack sized to pass through the upper opening and connected to the enclosure for movement between a retracted position within the interior and an extended position external to the enclosure;
   (d) a lock assembly for releasably securing the cover to the below ground enclosure, the lock assembly moveable between a locked position and an open position;
   (e) a pressurized gas source fluidly connectable to the interior; and
   (f) pressure management valving operably connected to the lock assembly and the pressurized gas source for selectively introducing a pressurized gas from the source into the interior and for selectively venting the pressurized interior.

4. A below ground cable component enclosure, comprising:

(a) an enclosure defining an interior;

(b) a removable cover releasably and repeatedly engaging the enclosure;

(c) a seal assembly intermediate the cover and the enclosure to provide a repeatable sealed relation therebetween;

(d) a pressurized gas source retained in the interior; and (e) a valving assembly for selectively releasing a pressurized gas from the gas source to the interior.

5. A method of housing cable components, comprising:

(a) disposing at least a portion of a sealable enclosure below ground to locate a portion of a sealable volume below ground, the sealable volume including a vertically displaceable rack;

(b) locating a cable component within the portion of the sealable volume located below ground;

(c) sealing the portion of the sealable volume located below ground; and (d) pressurizing the portion of the sealable volume located below ground to a pressure greater than atmospheric.

6. The method of claim 5, further comprising pressurizing the enclosure to a pressure greater than atmospheric from a pressurized gas source within the enclosure.

7. The method of claim 5, wherein sealing the enclosure initiates pressurizing the enclosure.

8. A below ground cable management system, comprising:

(a) an air impervious enclosure having an access port and a cable port;

(b) a cover releasably connected to the enclosure to form a fluid tight seal therebetween;

(c) a pressurized gas valve assembly configured to operably connect to a pressurized gas source in the enclosure; and (d) a valve assembly for pressurizing the enclosure at a pressure greater than an atmospheric pressure upon connecting the cover and the enclosure and venting the enclosure to a pressure substantially equal to the atmospheric pressure.

9. The below ground system of claim 8, further comprising a pressure sensor in the enclosure for monitoring the pressure at a location in the enclosure, and a transmitter for emitting a signal upon the pressure in the enclosure reaching a predetermined value.

\* \* \* \* \*